(No Model.)

W. J. BROWN.
WHEEL.

No. 435,963. Patented Sept. 9, 1890.

Witnesses:
Otto Luebkert
O. V. Sirkey

Inventor:
William James Brown
By Wm. H. Lotz
Attorney

United States Patent Office.

WILLIAM JAMES BROWN, OF MOMENCE, ILLINOIS.

WHEEL.

SPECIFICATION forming part of Letters Patent No. 435,963, dated September 9, 1890.

Application filed June 9, 1890. Serial No. 354,681. (No model.)

*To all whom it may concern:*

Be it known that I, WILLIAM JAMES BROWN, a citizen of the United States of America, residing at Momence, in the county of Kankakee and State of Illinois, have invented certain new and useful Improvements in Wheels, of which the following is a specification, reference being had therein to the accompanying drawings.

It is a well-known fact that a breakdown of a car wheel or axle and the consequent wrecking of a railway-train is in most instances caused by the tremendous friction of the car-wheels on the rails while passing over a curve in the track, because the wheels on the outer rail of the curve will have to travel a greater distance than the wheels riding on the inner rail. This difference heretofore necessitated a certain amount of sliding of the wheels on such rails, liable not only to scale and break the rails, but also to exert upon the wheels and axle a severe torsional strain, and upon the axle-boxes and the truck-frame a heavy twisting force more destructive thereto than any strain from other causes.

Now it is the object of this my invention to provide a car-wheel the rim of which will revolve upon the hub independently of the rotation of the axle, whereby with one of the two wheels mounted upon each axle thus constructed the car will move over a curve with the same ease as over a straight-line track, and with this object in view my invention consists of the novel devices and combinations of devices hereinafter described and specifically claimed.

Figure 2:
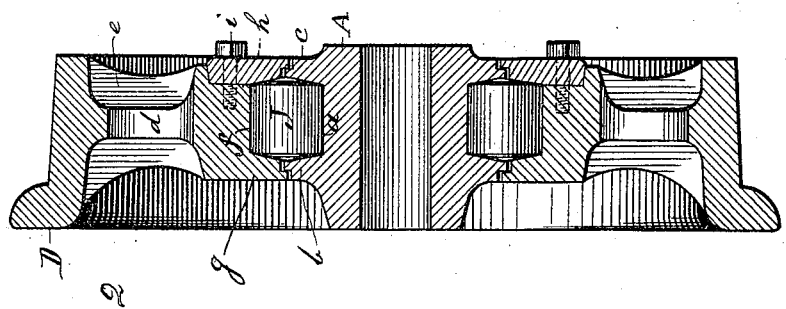
Figure 1:
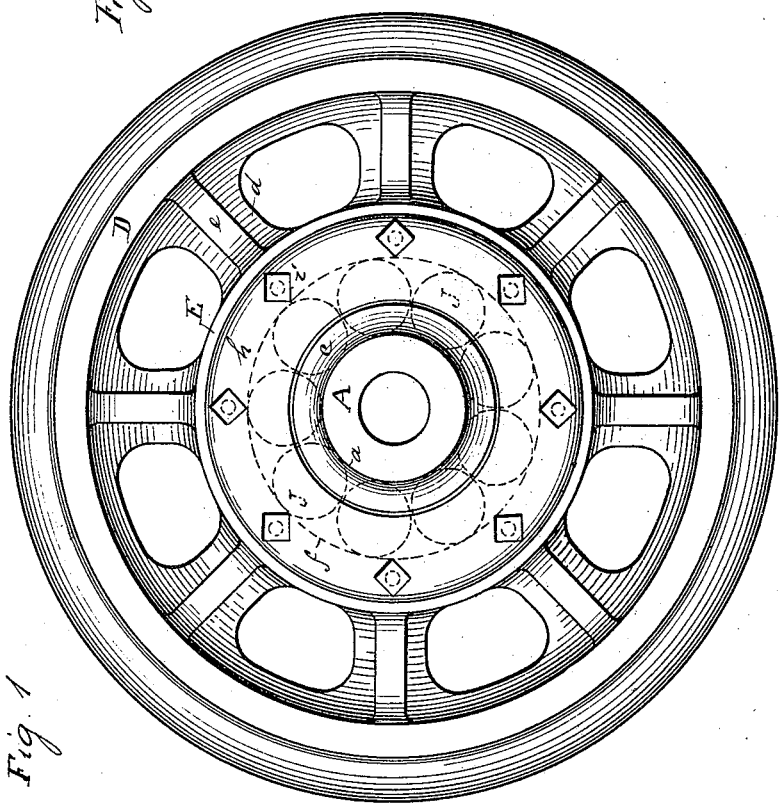

In the accompanying drawings, Figure 1 represents an elevation, and Fig. 2 a transverse section through the center line of my improved car-wheel.

Corresponding letters of reference in both figures of the drawings designate like parts.

A denotes the hub of the wheel, which is bored to fit the axle to be rigidly mounted thereon. This hub is provided in its periphery with a groove having a cylindrical bottom $a$, with slanting sides formed by annular flanges $b$ and $c$, that on their exterior edges are turned to have an offset or shoulder.

D is the rim of the usual shape for track-wheels, and E is an auxiliary hub concentric with such rim and rigidly connected therewith by a web $d$ and radial ribs $e$. This auxiliary hub E has a cylindrical bore $f$ corresponding in width with bottom $a$ of the groove of hub A, and has a rigid flange $g$ to one side, providing a slanting shoulder and turned on its inner edges with an offset that coincides with the offset of flange $b$, forming a lap-joint therewith. The side of auxiliary hub E opposite to flange $g$ is recessed for a ring-plate $h$, fitted therein and secured by tap-screws $i$. This ring-plate $h$ is so bored and turned that after being thus secured it forms a slanting shoulder to bore F and a lap-joint with flange $c$, similar to flanges $b$ and $g$. Between the cylindrical surfaces $a$ and $f$, the flanges $b$, $c$, and $g$ and the ring-plate $h$, are inserted a series of cylindrical rollers $j$, fitting snugly between the surfaces $a$ and $f$ and having somewhat conical ends again fitting the slanting shoulders formed by the flanges and ring-plate. For putting the wheel together all the rollers J are first inserted into the groove $a$ of hub A. Then the hub E is placed over these rollers, and finally the ring-plate $h$ is secured by tap-screws $i$. These rollers J will accommodate themselves in their circular track not to touch each other, so as not to have any frictional contact. A wheel thus constructed will be complete in itself and can be mounted upon any common car-axle. It is laterally as rigid as a solid wheel, while at the same time the rim portion of the wheel will rotate upon the hub with the least possible friction. The edges of the flanges and ring-plate of the hub and rim without touching will form lap-joints that will exclude dust. One of two wheels to each axle being thus constructed, the freedom of its rim to rotate independently of the axle will compensate for any difference of track length each wheel may have to follow while passing over a curve, and will thereby obviate all frictional and consequent torsional and twisting and strains to the axles and truck-frames, whereby not only a saving of power, but also of repairs necessitated from wear and tear, will be attained and the usefulness of the running-gear of the cars will be prolonged considerably.

This improvement will not only be advantageous for car-wheels, but also for traction wheels of agricultural machinery.

What I claim is—

1. In a wheel, the hub A, having in its periphery an annular groove with a cylindrical bottom $a$, and with flanges $b$ and $c$, providing slanting sides to such groove, and the rim D, having auxiliary hub E, with cylindrical bore $f$, rigid flange $g$, and ring-plate $h$, secured by screws $i$, and both the flange $g$ and ring-plate $h$ providing slanting sides to bore $f$, and cylindrical rollers J, snugly fitting between the surfaces $a$ and $f$, and having conical ends shouldering between the slanting sides thereof, substantially as set forth.

2. In a wheel, the hub A, having in its periphery an annular groove with a cylindrical bottom $a$, and with flanges $b$ and $c$, providing slanting sides to such groove, and the rim D, having auxiliary hub E, with cylindrical bore $f$, rigid flange $g$, and ring-plate $h$, secured by screws $i$, both the flange $g$ and ring-plate $h$ providing slanting sides to bore $f$, and the meeting edges of the several flanges and ring-plate having offsets that form lap-joints with each other, and a series of cylindrical rollers J, having conical ends snugly fitting between the surfaces $a$ and $f$ and shouldering between the slanting sides thereof, substantially as set forth.

In testimony whereof I affix my signature in presence of two witnesses.

WILLIAM JAMES BROWN.

Witnesses:
 WILLIAM H. LOTZ,
 OTTO LUEBKERT.